United States Patent [19]
Sato et al.

[11] Patent Number: 5,761,391
[45] Date of Patent: Jun. 2, 1998

[54] ARITHMETIC UNIT FOR CALCULATING DISTANCE BETWEEN OBJECTS

[75] Inventors: Yuichi Sato; Mitsunori Hirata; Tsugito Maruyama, all of Kawasaki, Japan

[73] Assignee: Fujitsu Ltd., Kawasaki, Japan

[21] Appl. No.: 725,308

[22] Filed: Oct. 2, 1996

[30] Foreign Application Priority Data

May 22, 1996 [JP] Japan ................................. 8-127438

[51] Int. Cl.$^6$ ........................... G05B 19/04; G05B 19/18
[52] U.S. Cl. ................... 395/90; 395/119; 395/105; 364/461
[58] Field of Search ......................... 364/461, 460; 395/119, 90, 105, 120

[56] References Cited

U.S. PATENT DOCUMENTS

| | | | |
|---|---|---|---|
| 4,578,757 | 3/1986 | Stark | 364/461 |
| 4,922,430 | 5/1990 | Wavish | 364/461 |
| 5,047,916 | 9/1991 | Kondo | 364/167.01 |
| 5,056,031 | 10/1991 | Nakano et al. | 364/461 |
| 5,150,452 | 9/1992 | Pollack et al. | 395/90 |
| 5,347,459 | 9/1994 | Greenspan et al. | 364/461 |

FOREIGN PATENT DOCUMENTS

| | | | |
|---|---|---|---|
| 2-224004 | 9/1990 | Japan | G05D 1/02 |
| 6-83422 | 3/1994 | Japan | G05B 19/403 |
| 6-259506 | 9/1994 | Japan | G06F 15/60 |
| 7-100733 | 4/1995 | Japan | B23Q 15/00 |

OTHER PUBLICATIONS

E. Gilbert, et al. "A Fast Procedure for Computing . . . Three–Dimensional Space"; IEEE Journal of Robotics and Automation, vol. 4, No. 2 (Apr. 1988); pp. 193–203.

E. Gilbert et al. "A Fast Procedure for Computing the Distance Between Complex Objects in Three–Dimensional Space" IEEE Journal of Robotics and Automation, vol. 4, No. 2, pp. 193–203, Apr. 1988.

E. Rimon et al. "Efficient Distance Computation Using Best Ellipsoid Fit" Intelligent Control, 1992 Int'l Symposium pp. 360–365.

*Primary Examiner*—Tariq R. Hafiz
*Assistant Examiner*—Jason W. Rhodes
*Attorney, Agent, or Firm*—Staas & Halsey

[57] ABSTRACT

A unit in a computer for computing a closest distance between two three-dimensional convex objects. At least one of the objects is a convex curved surface object. A first closest vector arithmetic unit is provided for identifying a preliminary closest vector coupling the closest points of the two objects by repeatedly calculating for each object an inner product of a candidate for the preliminary closest vector directed from a first of the two objects to a second of the two objects and a plurality of position vectors. Each position vector being one of a position vector of a vertex where the first object is a convex polyhedron, and a position vector of a control point of a convex curved surface patch where the first object is a convex curved surface object comprising sets of convex curved surface patches. A position vector for each object having a maximum inner product is extracted and a new candidate for the preliminary closest vector is formed by a vector connecting the two position vectors. A second closest vector arithmetic unit corrects the preliminary closest vector to identify a new closest vector perpendicularly intersecting a tangent plane in contact with the object having a convex curved surface at the closest point by starting from the preliminary closest vector and sequentially updating a given coordinate on the surface of the object until an inner product of a vector on the tangent plane and the closest vector on the given coordinates has the smallest possible value.

10 Claims, 7 Drawing Sheets

max{-v0 • x : x εX}  max{-v0 • y : y εY}

FIG. 5(b)

max{-v1 • x : x εX}  max{-v1 • y : y εY}

FIG. 5(c)

↓ REPEAT

Vi = Vfinal max{-vi • x : x εX}  max{-vi • y : y εY}

ARITHMETIC UNIT FOR CALCULATING DISTANCE BETWEEN OBJECTS

BACKGROUND OF THE INVENTION

1. Field of the Invention

The present invention relates to an arithmetic unit for the distance between objects for computing the closest distance between objects (e.g. computer graphics (CG) models) constructed on a computer.

2. Description of the Related Art

In the fields, for example, a CAD system for a mechanism design, a planning by robots, an off-line teaching, and a virtual reality system such as games using a high speed graphics workstation/personal computer, animations and a walk through, it is desired that the closest distance between CG model-to-model constructed on a computer is computed to determine as to whether the CG models are located apart from one another or in a state of a collision with each other, and in addition when the CG models are located apart from one another, a margin to the collision with each other is known.

The conventional schemes for the collision check, which is performed hitherto to meet the demands of the above-mentioned matter, are classified as follows.

- (a) A scheme in which covering with spheres is adopted. According to this scheme, objects are covered with spheres, and a check of collision between the objects is repeatedly performed to determine the collision state between the objects. This scheme is disclosed in U.S. Pat. No. 4,578,757 (Stark), U.S. Pat. No. 4,922,430 (Wavish), U.S. Pat. No. 5,056,031 (Nakano et al.), Japanese Patent Laid Open Gazette Hei.6-83422, Japanese Patent Laid Open Gazette Hei.2-224004, Japanese Patent Laid Open Gazette Hei.6-259506, and Japanese Patent Laid Open Gazette Hei.7-100733.
- (b) A scheme in which space is partitioned into an assembly of fine lattices to produce a spatial map wherein signs are assigned for areas occupied by an obstacle and the other areas. A collision state is determined by retrieving as to where the object of interest of the party end is located in the spatial map. It is noted that the octo tree scheme is included in this scheme. This scheme is disclosed in U.S. Pat. No. 5,150,452 (Pollack) and U.S. Pat. No. 5,347,459 (Greenspan et al). Particularly, in U.S. Pat. No. 5,347,459, in order to simplify the retrieval, the sphere covering scheme of the above-mentioned item (a) is used together with this scheme.
- (c) A scheme in which a map concerning areas involving collision and the other areas is constructed on the "Configuration Space" which is well known in the field of the robotics, and a collision determination is performed within this space. This scheme is disclosed in U.S. Pat. No. 5,047,916 (Kondo). According to the scheme disclosed in U.S. Pat. No. 5,047,916, the "Configuration Space" is partitioned as a lattice to make out a map for a collision determination.
- (d) In a publication "E.G. Gilbert, D.W.Johnson, and S.S. Keerthi, IEEE Journal of Robotics and Automation, Vol. 4, No. 2, pp.193–203, 1988", there is proposed a scheme in which an object is restricted to a convex polyhedron, and the closest distance between convex polyhedron-to-convex polyhedron is evaluated.

According to this scheme, the closest vector coupling closest point-to-closest point of two convex polyhedrons, which is directed from one (oneself) of the two convex polyhedrons to the another convex polyhedron (party), is evaluated on the basis of such a principle that in the comparison of the closest vector with the respective position vectors of the vertexes constituting oneself in the inner product, the inner product involved in the vertex of oneself nearer the closest point to the party has a larger value than the inner product involved in the vertex of oneself farther from the closest point.

The schemes mentioned in the above-referenced items (a) to (c) are applicable to any objects having arbitrary configuration, but not restricted to the convex polyhedrons and also convex objects. In this respect, the schemes of items (a) to (c) are wider in applicability than the scheme of item (d). On the other hand, the schemes of items (a) to (c) involve the following drawbacks as compared with the scheme of item (d).

First, according to the scheme of item (a) adopting the spherical covering, in a case where the convex polyhedron is selected as an object of interest, which needs a preprocessing such that an object is covered with spheres, there is a need to perform too much computation as compared with the scheme of item (d). Further, there is such a problem that the distance between objects is not be calculated, and as a result a margin to the collision cannot be measured.

According to the scheme of item (b), it takes a lot of time for a preprocessing to make up a map in which a working space is partitioned into a lattice. Further, in a case where the environment moves, there is a need to do over again making up of the map. Thus, it is impossible to cope with environmental variations on a real time basis. Further, according to the scheme of item (b), since space is partitioned as a lattice, it is difficult to compute information with greater accuracy over a unit lattice.

According to the scheme of item (c), it takes a lot of time for making up a configuration space. Further, similar to the scheme of item (b), in a case where the environment moves, there is a need to do over again making up of the map. Thus, it is impossible to cope with environmental variations on a real time basis. In a case where a configuration space is partitioned as a lattice, as proposed in U.S. Pat. No. 5,047,916 (Kondo), it is difficult to compute information with greater accuracy over a unit lattice.

As compared with the schemes of items (a) to (c), according to the scheme of item (d), it is possible to compute at very high speed the distance between objects mutually moving without necessity of the special preprocessing. But, the objects are restricted to the convex polyhedron. Therefore, with regard to the check of the collision state between the objects having free curved surfaces which are often used in a design plan and the like, there is a need to perform a processing for the objects having free curved surfaces with an approximation by a field of sets in which a large number of polyhedron patches are put together. However, according to this scheme, a large number of polyhedron patches are needed. This involves such a drawback that a speed for a graphical display of objects is slowed down. On the other, in order to provide the faster display speed, if the number of polyhedron patches for defining objects are reduced and the distance computation or the collision check is performed, errors will be large.

SUMMARY OF THE INVENTION

In view of the foregoing, it is therefore an object of the present invention to provide an arithmetic unit for the distance between objects having an improved applicability limit by extending the object of interest to an arbitrary convex object which may have the convex curved surface, and is capable of computing at high speed the distance between two convex objects.

To achieve the above-mentioned objects, according to the present invention, there is provided a first arithmetic unit for a distance between objects for computing a closest distance between two three-dimensional convex objects in accordance with shape information including arrangement position information on said two convex objects, one of said two convex objects being a convex polyhedron and another or both the objects being constituted of a convex curved surface object comprising sets of convex curved surface patches, said arithmetic unit for the distance between objects comprising:

(1—1) first closest vector arithmetic means for evaluating a closest vector coupling closest points of said two convex objects to each other, in which of an inner product of a closest vector directed from one of said two convex objects to another object and a position vector of a vertex in a case where said one convex object is a convex polyhedron or a position vector of a control point constituting the convex curved surface patches constituting the convex curved surface object in a case where said one convex object is a convex curved surface object, an inner product on the vertex or the control point near the closest point to the another convex object has a larger value than an inner product on the vertex or the control point apart from the closest point of said one convex object; and (1-2) second closest vector arithmetic means for correcting the closest vector evaluated by said first closest vector arithmetic means to a new closest vector perpendicularly intersecting a plane being in contact with the convex curved surface object at the closest point of the convex curved surface object.

According to the first arithmetic unit for a distance between objects, in the first closest vector arithmetic means (1—1), there is evaluated, using the principle described in item (1—1), for example, a scheme disclosed in the above-mentioned publication (d), the closest vector in the event that both the convex objects of interest are regarded as the polyhedron. In addition, in the second closest vector arithmetic means (1-2), there is evaluated, on the basis of the principle described in item (1-2), a new closest vector through modifying the closest vector evaluated by the first closest vector arithmetic means. Thus, it is not needed that the object of interest is a convex polyhedron. As a result, the object is extended to arbitrary convex objects having a convex curved surface, so that an applicability limit is extremely extended. In addition, the arithmetic based on the principles described in items (1—1) and (1-2) permits higher speed operations as compared with the prior arts (1) to (3) as mentioned above. Further, according to the arithmetic based on the principles described in items (1—1) and (1-2), it is possible not only to determine whether two objects of interest are in the collision state, but also to evaluate the distance between the closest points between two convex objects.

Incidentally, in a case where a lot of convex objects exist, i.e. over three objects, and it is unclear as to whether which two objects of the lot of convex objects are in the state of easy-to-collision, that is, it is unclear as to which two objects of the lot of convex objects is to be evaluated in connection with the closest vector, it is preferable to use a scheme (cf. Japanese Patent Application No. 174627/1995) in which instead of evaluating the closest vector on all of the combination of the lot of convex objects, the respective convex objects are covered with enveloping spheres and of those enveloping spheres a plurality of spheres closed are covered with further a single enveloping sphere, in this manner two sets of hierarchical meta trees is constructed, and a Depth-first search is practiced on the two sets of hierarchical meta trees, thereby selecting a pair of highest possibility of convex objects in approach.

Here, in the first arithmetic unit for a distance between objects, it is preferable that said arithmetic unit further comprises:

(1-3) collision determination means for determining as to whether said two convex objects are in a collision state, in accordance with the new closest vector evaluated by said second closest vector arithmetic means.

Because, in many cases, there is a need to provide a determination result as to whether the objects are finally in the state of collision.

Further, in the first arithmetic unit for a distance between objects, it is acceptable that said first arithmetic unit further comprises:

(1-4) shape information storage means for storing shape information comprising sets of the control points constituting the convex curved surface patches constituting the convex curved surface object, including sets of the vertexes of a convex polygon in a case where said one convex object is the convex polyhedron;

(1-5) shape information updating means for performing arithmetic on coordinates after a movement or a deformation of the vertexes or the control points of the convex objects in accordance with information for instructing a movement or a deformation of the convex objects, thereby evaluating a new shape information; and (1-6) curved surface patch information producing means for producing convex curved surface patches constituting the convex curved surface object in accordance with the shape information of the convex curved surface object.

The arithmetic unit for a distance between objects according to the present invention makes it possible to perform higher speed operations as compared with the prior art. Consequently, the arithmetic unit for a distance between objects according to the present invention, which comprises the means as described in above items (1-4) to (1-5), is suitable for the use of evaluating at high speed the distance between the convex objects moved or deformed.

In this case, as described in Japanese Patent Laid Open Gazette Hei. 7-134735, it is acceptable that the first closest vector arithmetic means evaluates the inner product only on the respective vertexes or control points within an area near the closest point when the convex object of interest is at the position immediately before a movement or in a state immediately before a deformation. This makes it possible for the first closest vector arithmetic means to evaluate at higher speed the closest vector on the convex object after the movement or the deformation.

On the other hand, in the event that a shift vector or a deformation rate of the convex object between the adjacent frames is less than a predetermined rate, when the closest vector after the movement or the deformation is evaluated, as will be described hereinafter, it is acceptable to omit the computation of the closest vector by the first closest vector arithmetic means. In this case, in the first arithmetic unit for a distance between objects, it is characterized in that when the convex object is moved or deformed, said second closest vector arithmetic means modifies the new closest vector evaluated before a current movement or deformation to a further new closest vector, instead of evaluating a closest vector after a movement or a deformation by said first closest vector arithmetic means.

In the continuous movement or the continuous deformation, in the event that the variation from the position immediately before the movement or the deformation state immediately before the deformation is little, the closest vector immediately before, which was evaluated by the second closest vector arithmetic means when the convex object is at the position immediately before the movement or in the deformation state immediately before the deformation, is used as the approximate closest vector, instead of evaluating over again the approximate closest vector by the first closest vector arithmetic means, to modify the closest vector immediately before used as the approximate closest vector, thereby evaluating the closest vector on the convex object after the current movement or deformation. This makes it possible to provide a higher speed arithmetic operation processing as compared with such a scheme that the closest vector is evaluated over again using the first closest vector whenever a movement or a deformation occurs.

Further, in the first arithmetic unit for a distance between objects, it is preferable that said arithmetic unit further comprises:

(1-7) display means for displaying convex objects based on the shape information stored in said shape information storage means (1-4) and the new shape information evaluated by said shape information updating means (1-5).

The use of such a display means makes it possible to intuitively grasp the movement state and the deformation state of the convex object.

To achieve the above-mentioned objects, according to the present invention, there is provided a second arithmetic unit for a distance between objects for computing a closest distance between two two-dimensional convex objects in accordance with shape information including arrangement position information on said two convex objects, one of said two convex objects being a convex polyhedron and another or both the objects being constituted of a convex curved line object comprising sets of convex curved line patches, said arithmetic unit for the distance between objects comprising:

(2-1) first closest vector arithmetic means for evaluating a closest vector coupling closest points of said two convex objects to each other, in which of an inner product of a closest vector directed from one of said two convex objects to another object and a position vector of a vertex in a case where said one convex object is a convex polyhedron or a position vector of a control point constituting the convex curved line patches constituting the convex curved line object in a case where said one convex object is a convex curved line object, an inner product on the vertex or the control point near the closest point to the another convex object has a larger value than an inner product on the vertex or the control point apart from the closest point of said one convex object; and (2—2) second closest vector arithmetic means for correcting the closest vector evaluated by said first closest vector arithmetic means to a new closest vector perpendicularly intersecting a plane being in contact with the convex curved line object at the closest point of the convex curved line object.

The effect of the second arithmetic unit for a distance between objects is the same as that of the first arithmetic unit for a distance between objects, and thus its explanation will be omitted.

In the second arithmetic unit for a distance between objects mentioned above, it is preferable that said arithmetic unit further comprises:

(2-3) collision determination means for determining as to whether said two convex objects are in a collision state, in accordance with the new closest vector evaluated by said second closest vector arithmetic means.

Further, in the second arithmetic unit for a distance between objects mentioned above, it is acceptable that said arithmetic unit further comprises:

(2-4) shape information storage means for storing shape information comprising sets of the control points constituting the convex curved line patches constituting the convex curved line object, including sets of the vertexes of a convex polygon in a case where said one convex object is the convex polyhedron;

(2-5) shape information updating means for performing arithmetic on coordinates after a movement or a deformation of the vertexes or the control points of the convex objects in accordance with information for instructing a movement or a deformation of the convex objects, thereby evaluating a new shape information; and (2-6) curved line patch information producing means for producing convex curved line patches constituting the convex curved line object in accordance with the shape information of the convex curved line object.

In this case, it is preferable that when the convex object is moved or deformed, said second closest vector arithmetic means (2—2) modifies the new closest vector evaluated before a current movement or deformation to a further new closest vector, instead of evaluating a closest vector after a movement or a deformation by said first closest vector arithmetic means.

Further, in the second arithmetic unit for a distance between objects, it is preferable that said arithmetic unit further comprises:

(2-7) display means for displaying convex objects based on the shape information stored in said shape information storage means and the new shape information evaluated by said shape information updating means.

DESCRIPTION OF THE PREFERRED EMBODIMENTS

Hereinafter, there will be described embodiments of the present invention.

Figure 1:
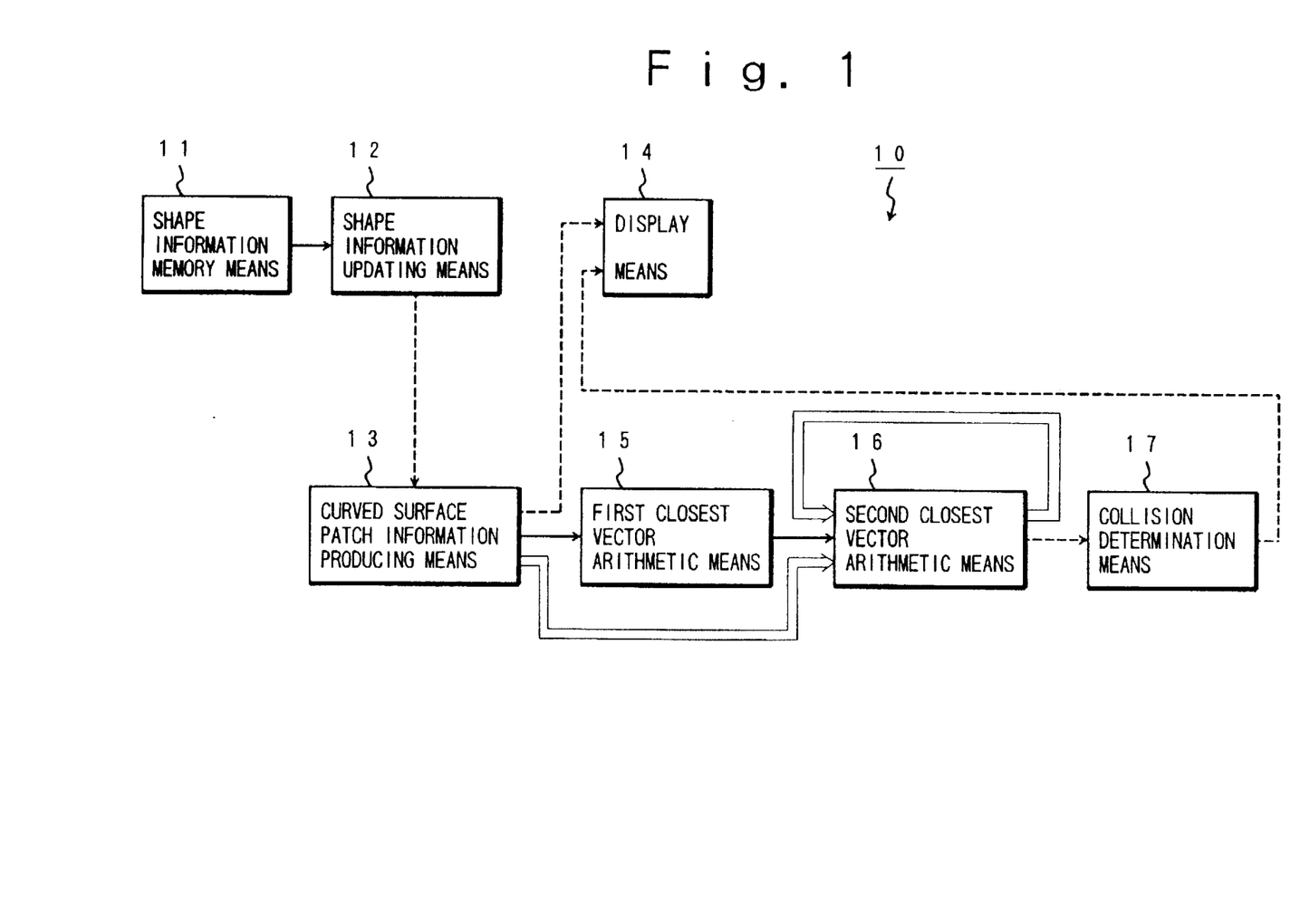
FIG. 1 is a block diagram of an arithmetic unit for the distance between objects according to one embodiment of the present invention.

FIG. 1 is a block diagram of an arithmetic unit for the distance between objects according to one embodiment of the present invention. In FIG. 1, a one-solid line of arrow denotes a flow of data as to the first time only; a two-solid line of arrow denotes a flow of data as to the second time et seqq.; and a broken line denotes a flow of data common to the first time and the second time et seqq.

An arithmetic unit 10 for calculating the distance between objects, which is shown in FIG. 1, has a shape information memory means 11 for storing shape information consisting of sets of vertexes of two convex objects of interest in computation of the distance between the closest points or consisting of sets of control points. It is either acceptable that the shape information consisting of sets of vertexes of the convex objects or sets of control points may be sets of information representing the respective vertexes or control points independently of one another, or a functional equation for analytically expressing the surface of the convex object. At least one of the two convex objects of interest in computation of the distance between the closest points may be constituted of sets of convex curved surface patches defined by the control points. It is either acceptable that the shape information memory means 11 stores the control points and the convex curved surface patches as well, or the control points only. In case of the latter, the convex curved surface patches defined by the control points stored in the shape information memory means 11 may be produced by a curved surface patch producing means 13 which will be described later. Another of the two convex objects of interest in computation of the distance between the closest points may be a convex curved surface object or a convex polyhedron constituted of sets of the vertexes.

The shape information stored in the shape information memory means 11 is read out and then fed to a shape information updating means 12 in which the coordinates after the movement or the deformation of the vertexes or the control points of the convex object are computed in accordance with the shape information read from the shape information memory means 11, or the shape information immediately before the movement or after the deformation, so that shape information of the convex object, which is sequentially moved or deformed for each frame, is evaluated.

The shape information read out from the shape information memory means 11 in the form of the initial state and the shape information read out from the shape information updating means 12 are fed to the curved surface patch producing means 13 in which in a case where the shape information read out from the shape information memory means 11 or the shape information updated by the shape information updating means 12 are sets of the control points of the convex curved surface object, the convex curved surface patch defining the surface of the convex curved surface object is produced on the basis of these control points. However, in a case where the shape information read out from the shape information memory means 11, which represents the initial state of the convex curved surface object, includes information of the convex curved surface patches in the initial state of the convex curved surface object, there is no need to produce the convex curved surface patch as to the shape information read out from the shape information memory means 11, which represents the initial state of the convex curved surface object. In this case, the curved surface patch producing means 13 produces the convex curved surface patch as to the convex curved surface object after updated by the shape information updating means 12.

The shape information including the convex curved surface patch information via the curved surface patch producing means 13 is fed to display means 14 in which the convex object of the shape (including an arrangement position) in the initial state, and the convex objects sequentially moved or deformed are continuously displayed.

Of the shape information via the curved surface patch producing means 13 shape information representative of the initial state is fed to a first closest vector arithmetic means 15. Incidentally, as will be described later, the shape information representative of the state after moved or deformed from the initial state needs no operation by the first closest vector arithmetic means 15, and thus be directly fed to a second closest vector arithmetic means 16.

In the first closest vector arithmetic means 15, the closest vector coupling the closest point-to-point of two convex objects with each other is evaluated on the basis of the entered shape information on the initial state.

In the first closest vector arithmetic means 15, when the closest vector is evaluated, there is adopted such a principle that in the comparison of the closest vector with the respective position vectors of the vertexes constituting oneself in the inner product, the inner product involved in the vertex of oneself nearer the closest point to the party has a larger value than the inner product involved in the vertex of oneself farther from the closest point. Details of this principle will be described later.

The closest vector evaluated by the first closest vector arithmetic means 15 is the closest vector which is obtained when both the two objects of interest are regarded as the convex polyhedron. This type of closest vector is insufficient in accuracy for the convex curved surface object.

The closest vector thus evaluated by the first closest vector arithmetic means 15 is fed together with shape information (including the curved surface patch information) of two convex objects of interest to a second closest vector arithmetic means 16 in which the closest vector evaluated by the first closest vector arithmetic means 15 is modified into the new closest vector having greater accuracy in accordance with a principle such that a plane coming in contact with a convex curved surface object at the closest point of the convex curved surface object and the closest vector coupling the closest point-to-point of two convex objects with each other perpendicularly intersect each other. Details of this principle will be described later.

The closest vector evaluated by the second closest vector arithmetic means 16 is fed to a collision determination means 17 in which when a length of the closest vector is smaller than a minute value $\epsilon$ (e.g. $10^{-10}$), it is determined that two convex objects of interest are in a collision state, and when a length of the closest vector is larger than a minute values $\epsilon$ (e.g. $10^{-10}$), it is determined that two convex objects of interest are mutually apart from one another. This determination result is transferred to the display means 14 in which information representative of presence/absence of the collision state is displayed together with the two convex objects of interest.

As mentioned above, there is a need to evaluate the closest vector by the first closest vector arithmetic means 15, when two convex objects of interest are in the initial state. As to shape information of the second frame et seqq. which have been subjected to the movement or the deformation by the shape information updating means 12, such shape information is fed directly to the second closest vector arithmetic means 16 through bypassing the first closest vector arithmetic means 15. In the second closest vector arithmetic means 16, with respect to the respective frames of the second frame et seqq., the closest vector evaluated on the frame immediately before by oneself is regarded as the approximate closest vector on the current frame, and the approximate closest vector is modified into the closest vector having greater accuracy on the current frame in accordance with the above-mentioned principle.

In this manner, on the display means 14 there are displayed on a real time the state in which two convex objects of interest are moved or deformed, and information as to whether the two convex objects are in a collision state.

Incidentally, while the above explanation have been made, referring to FIG. 1, on the assumption that two convex objects of interest are the three-dimensional objects, this is the same also in case of the two-dimensional objects. Consequently, the explanation for the two-dimensional objects will be omitted.

Figure 2:
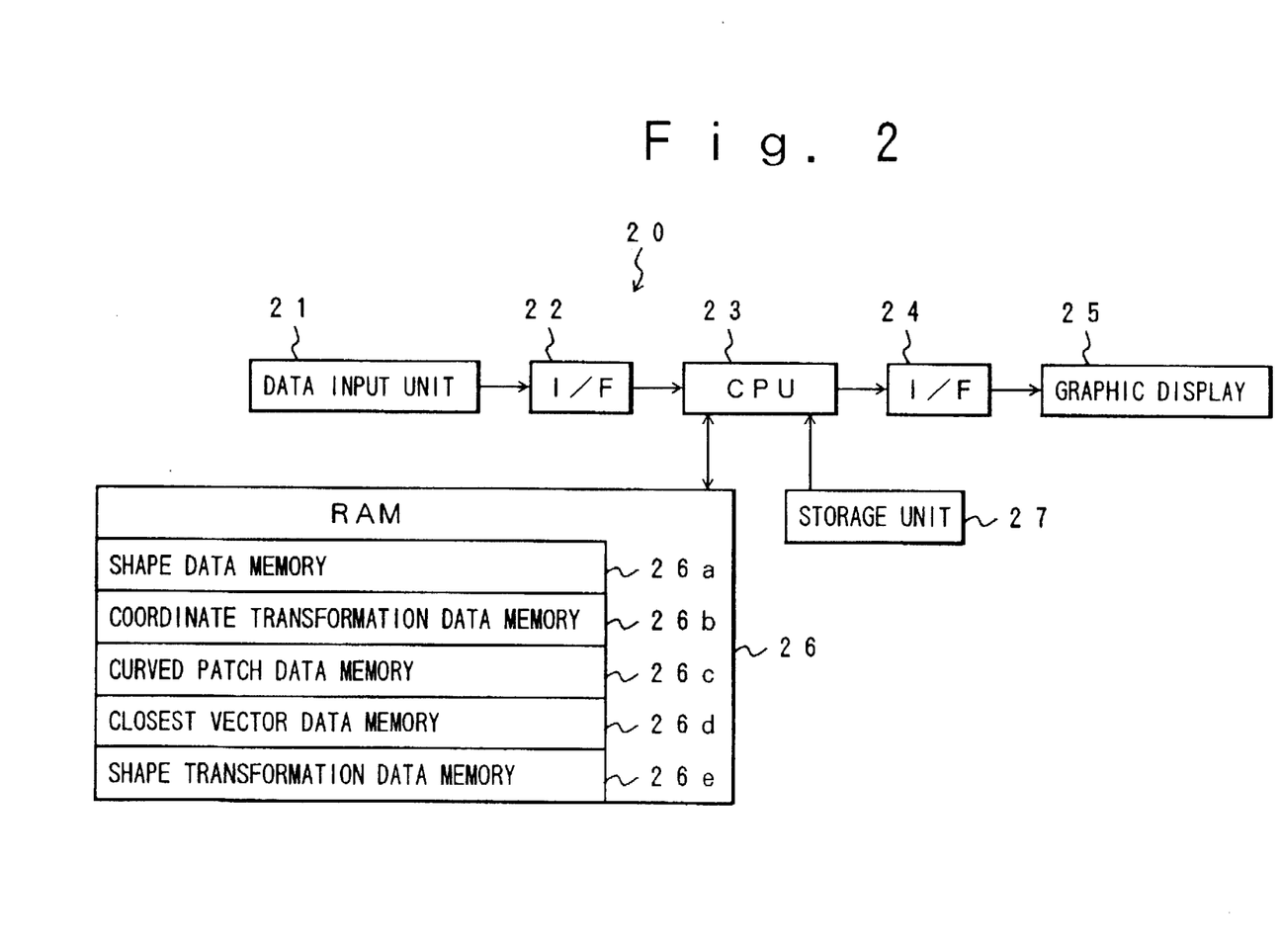
FIG. 2 is a block diagram of a hardware structure of one embodiment of a case in which an arithmetic unit for the distance between objects according to the present invention is incorporated into a computer system.

FIG. 2 is a block diagram of a hardware structure of one embodiment of a case in which an arithmetic unit for the distance between objects according to the present invention is incorporated into a computer system.

In an arithmetic unit 20 for the distance between objects, a CPU 23 serves to perform any logical operations such as a fundamental algorithm for computing the closest vectors, an operation for a display of a computing result, an operation for a graphical display of a movement of objects, and others.

A storage unit 27 stores shape data of working environment and members, their initial positions, an execution module of an algorithm for implementing an arithmetic unit for the distance between objects according to the present invention, an execution module for graphically displaying an movement of objects, and in addition data and execution modules needed for implementing functions as the arithmetic unit for the distance between objects.

A RAM 26 comprises: a shape data memory 26a for storing shape data as to working environment and members read out from the storage unit 27; a coordinate transformation data memory 26b for storing coordinate transformation data computed in the CPU 23 on the basis of movement instruction data entered through a data input unit 21 such as a mouse and the like; a curved surface patch data memory 26c for storing curved surface patch data of working environment and members, which are computed in the CPU 23 using the shape data stored in said shape data memory 26a and the coordinate transformation data stored in said coordinate transformation data memory 26b; a closest vector data memory 26d for storing closest vector data (including the closest points, the distance between objects, a collision determination result and the like) computed in the CPU 23 using a fundamental algorithm for computing the closest vector and the curved surface patch data stored in said curved surface patch data memory 26c; and a shape transformation data memory 26e for storing shape transformation data indicative of a member shape after a movement, which are computed in the CPU 23 using the shape data stored in said shape data memory 26a and the coordinate transformation data stored in said coordinate transformation data memory 26b.

The data input unit 21 serves to transmit position data and movement data as to the working environment and members via an interface 22 to the CPU 23.

A graphic display 25 is adapted to graphically display an image based on both the closest vector data stored in said closest vector data memory 26d and the coordinate transformation data stored in said coordinate transformation data memory 26b.

Hereinafter, there will be explained the algorithm for computing the closest vector upon classifying it into four cases: that is, a case (case 1) in which two convex objects of interest are three-dimensional convex objects and both the two convex objects are the convex curved surface objects; a case (case 2) in which two convex objects of interest are three-dimensional convex objects and one of the two convex objects is the convex curved surface object, and another is the convex polyhedron; a case (case 3) in which two convex objects of interest are two-dimensional convex objects and both the two convex objects are the convex curved surface objects; and a case (case 4) in which two convex objects of interest are two-dimensional convex objects and one of the two convex objects is the convex curved surface object, and another is the convex polyhedron.

(Case 1: three-dimensional convex objects; both two convex objects are the convex curved surface objects)

Figure 3:
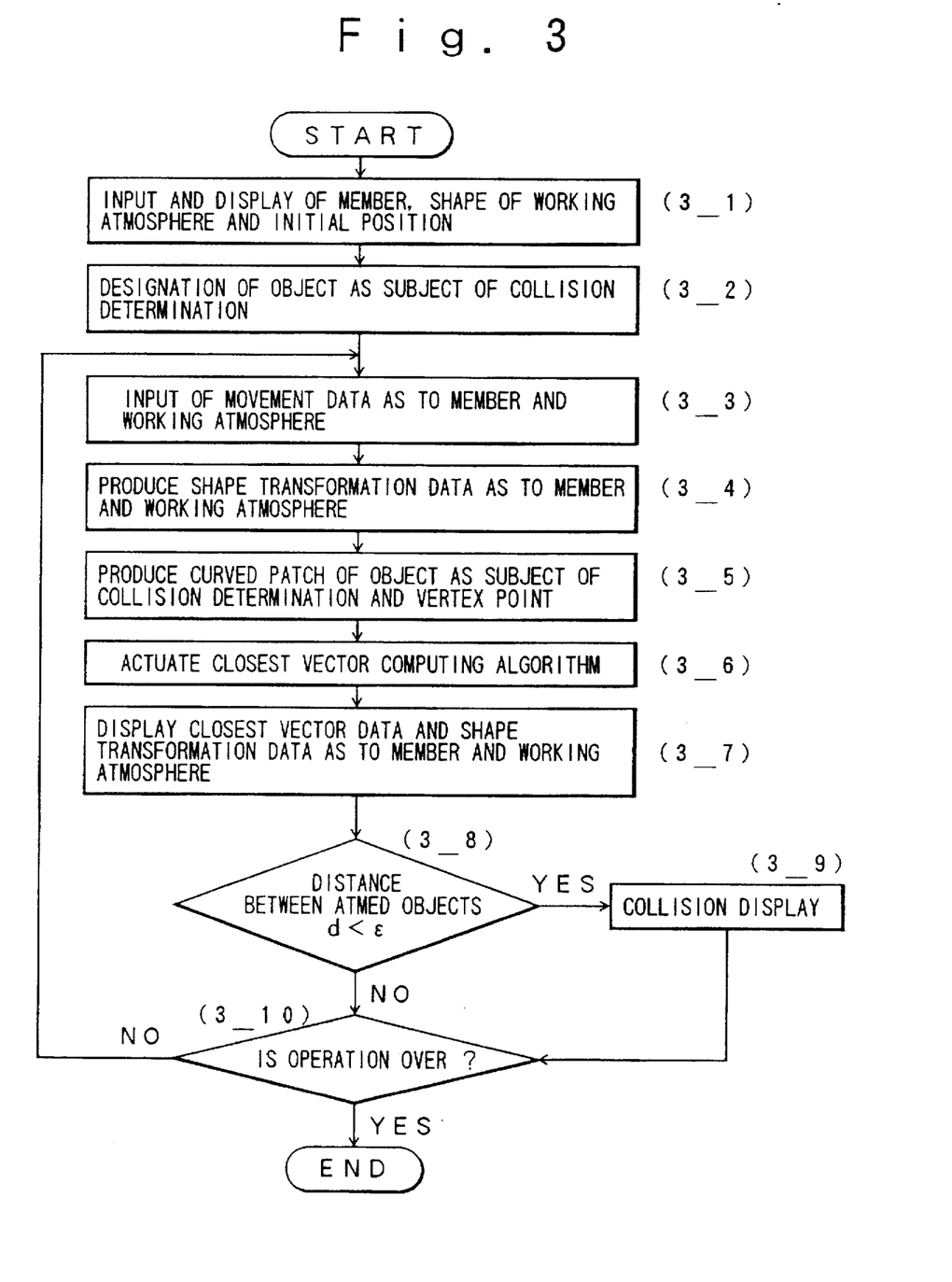
FIG. 3 is a flowchart useful for understanding a processing.

FIG. 3 is a flowchart useful for understanding a processing to be executed in the CPU 23 shown in FIG. 2.

First, in step 3_1, shapes of the working environment and members and their initial positions are read through the storage unit 27. In step 3_1, at the same time as an input, the working environment and members are displayed in the form of an initial arrangement on the graphic display 25 in accordance with information as to the initial positions. In step 3_2, objects of interest to be checked as to the collision state are selected, using the data input unit 21 such as a mouse and the like, from among the working environment and members displayed on the graphic display 25. In step 3_3, the objects of interest picked up by the mouse and the like are moved so that movement data are fed to the CPU 23 shown in FIG. 2. In step 3_4, a transformation matrix representative of a movement from the absolute coordinate space is computed on the basis of the movement data entered in step 3_3, and shape transformation data as to members and the working environment, which are representative of a movement of the working environment and members, are produced in accordance with the computed transformation matrix. In step 3_5, the curved surface patch data of the objects of interest selected for the collision determination are created on the basis of the shape transformation data produced in step 3_4. In step 3_6, upon receipt of a result of step 3_5, a closest vector computing algorithm is actuated. The closest vector computing algorithm will be described later. In step 3_7, an image based on a result of step 3_6 and the shape transformation data in step 3_4 is displayed on the graphic display 25. In step 3_8, a distance d between the objects of interest for a collision determination computed in step 3_7 is compared with a threshold $\epsilon$. As a result, in case of d <$\epsilon$, it is determined that the objects of interest are in the collision state, and a point of the collision is displayed in step 3_9. In step 3_10, it is determined as to whether the processing from step 3_3 to step 3_8 and step 3_9 is to be continued. In a case where it is determined that the processing from step 3_3 to step 3_8 and step 3_9 is to be continued, the program returns to the step 3_3 to enter movement data for the subsequent frame. If not to be continued, the program is over.

Figure 4:
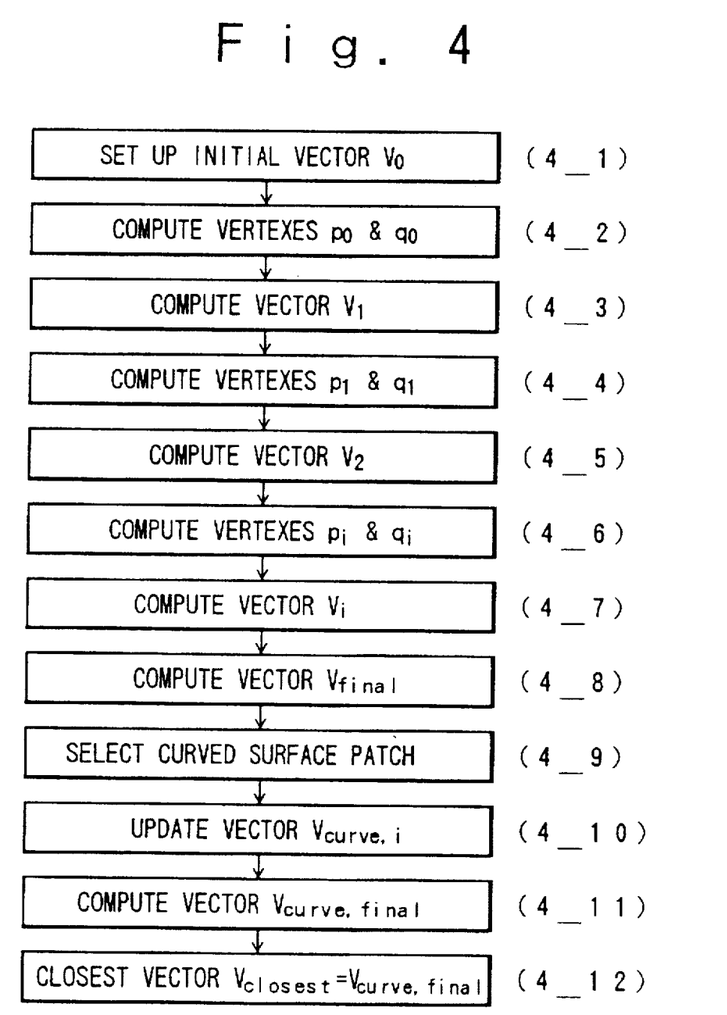
FIG. 4 is a flowchart useful for understanding the details of an algorithm for computing the closest vector.
Figure 5A:
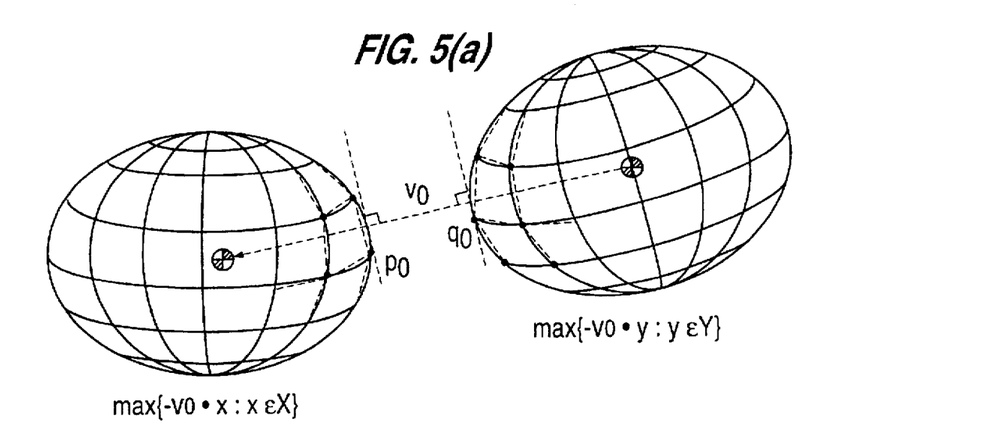
FIG. 5 is an explanatory view useful for understanding one embodiment of the first closest vector arithmetic means referred to in the present invention.
Figure 5B:
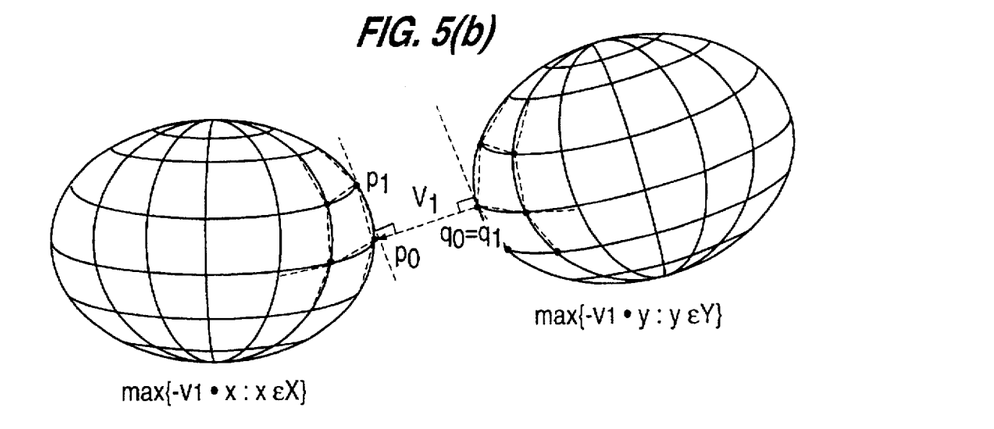
Figure 5C:
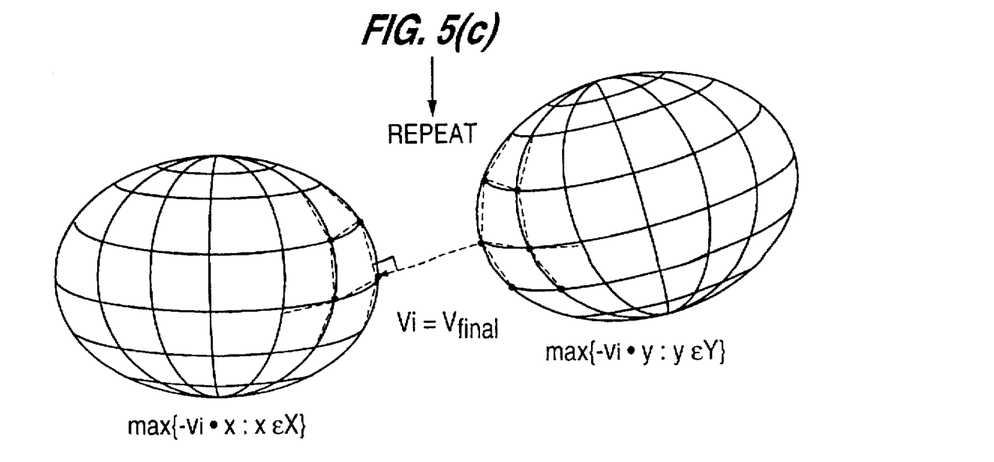
Figure 6:
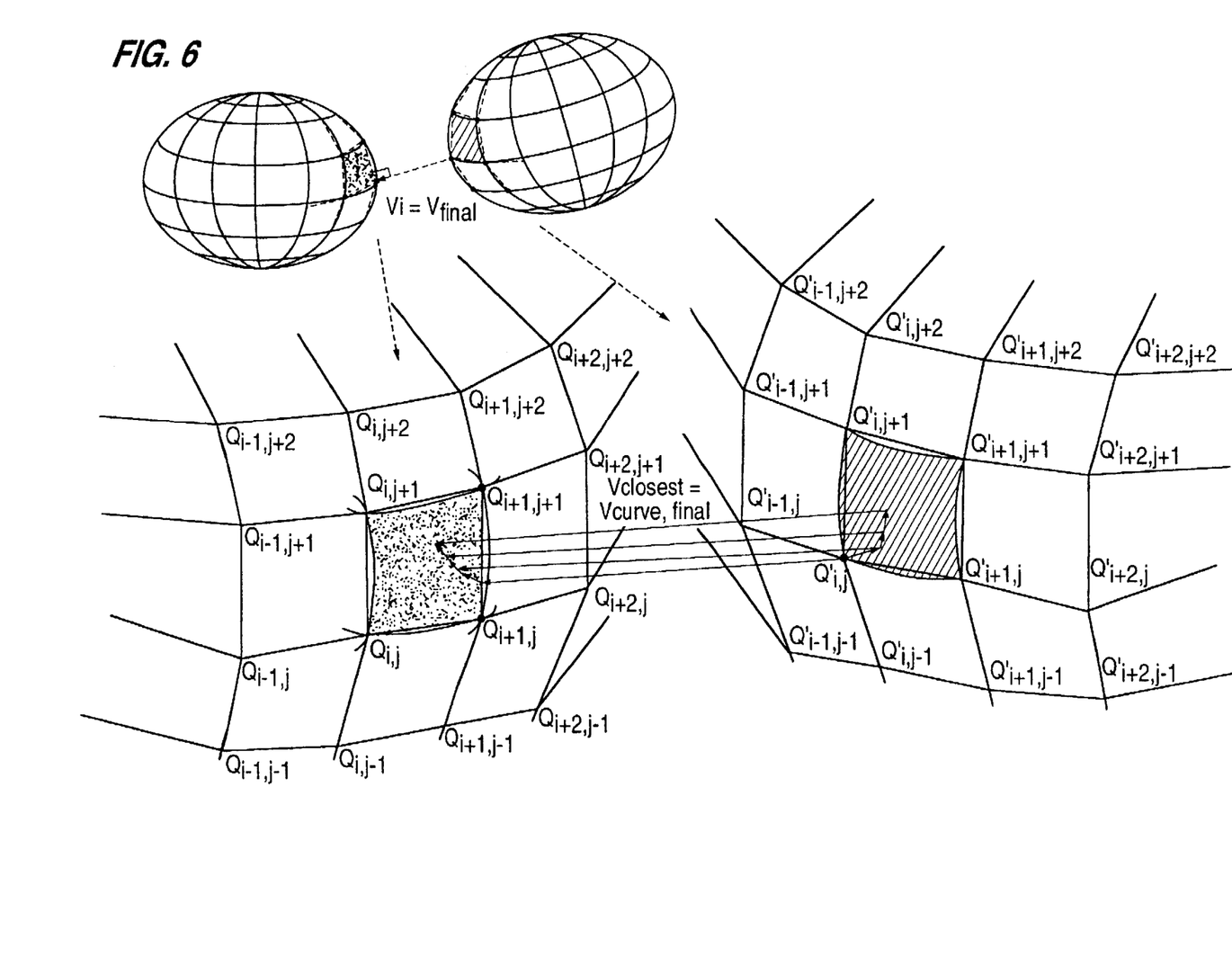
FIG. 6 is an explanatory view useful for understanding one embodiment of the second closest vector arithmetic means referred to in the present invention.

FIG. 4 is a flowchart useful for understanding the details of the algorithm for computing the closest vector in the step 3_6. FIG. 5 is an explanatory view useful for understanding one embodiment of the first closest vector arithmetic means referred to in the present invention. FIG. 5 shows by way of example illustrations as to the flow of steps 4_1 to 4_9 in FIG. 4. FIG. 6 is an explanatory view useful for understanding one embodiment of the second closest vector arithmetic means referred to in the present invention. FIG. 6 shows by way of example illustrations as to the flow of steps 4_10 to 4_12 in FIG. 4.

First, in step 4_1 of FIG. 4, the respective centers of gravity of two objects of interest are coupled to each other. This is denoted by an initial vector $v_0$ (cf. part (a) of FIG. 5). The center of gravity is usually given by an average of the position vector sets $\{Q_i\}$ defining a curved surface. In case of the polyhedron, the center of gravity is given by an average of the vertex vectors. In step 4_2, inner products of $-v_0$ and the position vector sets $X=\{Q_i\}$ defining the object of the left hand in FIG. 5 are evaluated, and the position vector representative of the maximum value of the inner products is denoted by $p_0$. Likely, inner products of $v_0$ and the position vector sets $Y=\{Q'_i\}$ defining the object of the right hand in FIG. 5 are evaluated, and the position vector representative of the maximum value of the inner products is denoted by $q_0$.

In step 4_3, vector $v_0$ is updated into $v_1=p_0-q_0$ (cf. part (b) of FIG. 5).

In step 4_4, in a similar fashion to that of step 4_2, inner products of $-v_1$ and the position vector sets $X=\{Q_i\}$ defining the object of the left hand in FIG. 5 are evaluated, and the position vector representative of the maximum value of the inner products is denoted by $p_1$. Likely, inner products of $v_1$ and the position vector sets $Y=\{Q'_i\}$ defining the object of the right hand in FIG. 5 are evaluated, and the position vector representative of the maximum value of the inner products is denoted by $q_1$. Generally, the position vector $p_1$ is different from the position vector $p_0$, and the position vector $q_1$ is different from the position vector $q_0$.

In step 4_5, vector $v_1$ is updated into $v_2=p_1-q_1$ (cf. part (b) of FIG. 5). As shown in step 4_6 and step 4_7, the similar operations are repeatedly performed to update vector $v_i$, and finally in step 4_8, the convergence vector $v_{final}$ of the vector $v_i$ is computed.

Exactly speaking, the vector $v_i$ is updated in accordance with a manner as set forth below.

The vector $v_i$ is the closest vector to the convex object defined by the vector sets $Y_i$. The vector sets $Y_i$ is updated in the form of $Y_{i+1}=\{\text{sub } Y_i, p_{i+1}-q_{i+1}\}$, where the sub $Y_i$ is a subset of $Y_i$, and the vector $v_i$ is expressed by the following equation.

$$v_i = \sum_{k=1}^{m} \lambda_k(p_k - q_k), p_k - q_k \in \text{sub } Y_i,$$

$$\lambda_k > 0, \sum_{k=1}^{m} \lambda_k = 1$$

where m is given by the maximum 4 in a three-dimensional Euclidean space, and the vector $v_i$ is expressed in the form of the closest vectors from the original point, in case of m=1, to the vertex, in case of m=2, to the line segment, and in case of m=3, to the triangle patch, respectively. In case of m=4, the internal parts of the tetrahedron, that is, $v=0$.

In the publication "E. G. Gilbert, D. W. Johnson, and S. S. Keerthi, 'A Fast Procedure for Computing the Distance Between Complex Objects in Three-Dimensional Space' IEE Journal of Robotics and Automation, Vol. 4, No. 2, pp 193–203, 1988", there is proposed an algorithm for efficiently computing coefficient $\lambda_k$. It has been confirmed that the updating processes of the vertex, $p_i$, $q_i$ and $v_i$ are converged by two or three times for almost all the convex polyhedrons. An amount of computation to the calculation of $v_{final}$ is mainly determined by the inner product calculation set forth below.

$$\max\{-v_i \cdot x : x \in X\},$$

$$\max\{-v_i \cdot y : y \in Y\},$$

Consequently, the load is in proportion to the total number of position vectors, that is, $M=M_1+M_2$.

Next, referring to FIGS. 4 and 6, step 4_9 et seqq., that is, one embodiment of the second closest vector arithmetic means referred to in the present invention will be explained hereinafter.

In step 4_9, from the following equation of $v_{final}$ $$v_{final} = \sum_{k=1}^{m} \lambda_k(p_k - q_k),$$

a pair of curved surface patches having position vectors $p_i$ and $q_i$ as the control point respectively is selected. Generally, in cases of m=1 and m=2, there exist around the position vector $p_i$ a plurality of curved surface patches having position vector sets $\{p_i\}$ as the control point. However, anyone of the plurality of curved surface patches may be selected. In step 4_10, the vector $v_{final}$ as the initial value is updated on the selected curved surface patch in accordance with following manner.

Hereinafter, it is assumed that the curved surface patch is expressed by the spline (B-spline) curved surface set forth below.

$$P_{i,j}(u, w) = U M_R B_R M_R^T W^T$$

$$B_R = \begin{bmatrix} Q_{i-1,j-1} & Q_{i-1,j} & Q_{i-1,j+1} & Q_{i-1,j+2} \\ Q_{i,j-1} & Q_{i,j} & Q_{i,j+1} & Q_{i,j+2} \\ Q_{i+1,j-1} & Q_{i+1,j} & Q_{i+1,j+1} & Q_{i+1,j+2} \\ Q_{i+2,j-1} & Q_{i+2,j} & Q_{i+2,j+1} & Q_{i+2,j+2} \end{bmatrix}$$

$$M_R = \begin{bmatrix} -1/6 & 1/2 & -1/2 & 1/6 \\ 1/2 & -1 & 1/2 & 0 \\ -1/2 & 0 & 1/2 & 0 \\ 1/6 & 2/3 & 1/6 & 0 \end{bmatrix}$$

$$U + [u^3 \ u^2 \ u \ 1]$$

$$W = [w^3 \ w^2 \ w \ 1]$$

where u and w are variables (scalars) of $0 \leq u$ and $w \leq 1$, respectively.

First, the initial value of the vector $V_{curve}$ is defined as $v_{final}$ evaluated in step 4_8. As the maximum value of the inner product is adopted when the vertexes $p_i$ and $q_i$ are updated, u and w satisfying the following equations are evaluated in accordance with the repeating scheme.

$$f_u(u, w) \equiv \frac{\partial P}{\partial u}, V_{curve} = [3u^2 \ 2u \ 1 \ 0] M_R \cdot (B_R \cdot V_{curve}) \cdot M_R^T W^T = 0$$

$$f_w(u, w) \equiv \frac{\partial P}{\partial w}, V_{curve} = U M_R \cdot (B_R \cdot V_{curve}) \cdot M_R^T \begin{bmatrix} 3w^2 \\ 2w \\ 1 \\ 0 \end{bmatrix} = 0$$

Specifically, when the following equations are given, $$\frac{\partial f_u}{\partial u} = [6u \ 2 \ 0 \ 0] D W^T$$

$$\frac{\partial f_u}{\partial w} = [3u^2 \ 2u \ 1 \ 0] D \begin{bmatrix} 3w^2 \\ 2w \\ 1 \\ 0 \end{bmatrix}$$

$$\frac{\partial f_w}{\partial w} = UD \begin{bmatrix} 6w \\ 2 \\ 0 \\ 0 \end{bmatrix}$$

$$\frac{\partial f_w}{\partial u} = \frac{\partial f_u}{\partial w}$$

$$D = M_R \cdot (B_R \cdot v_{curve}) \cdot M_R^T$$

u and w are updated in accordance with an equation set forth below.

$$\begin{bmatrix} \delta u \\ \delta w \end{bmatrix} = \begin{bmatrix} \frac{\partial f_u(u, w)}{\partial u} & \frac{\partial f_u(u, w)}{\partial w} \\ \frac{\partial f_w(u, w)}{\partial u} & \frac{\partial f_w(u, w)}{\partial w} \end{bmatrix}^{-1} \begin{bmatrix} -f_u(u, w) \\ -f_w(u, w) \end{bmatrix}$$

$$u \rightarrow u + \delta u$$
$$w \rightarrow u + \delta w$$

As the initial values of u and w, here it is assumed that u=w=½ by way of example. The above-mentioned operation is performed on both two convex curved surface objects as shown in FIG. 6.

The point-to-point on two convex curved surface objects, which are obtained when values $u_1$ and $w_1$ of the converged u and w are substituted into the equation of the curved surface, are coupled with each other. This vector is referred to as $v_{curve}$. The vector $v_{curve}$ is updated into $v_{curve1}$. The above-mentioned computation is repeatedly performed. At that time, as the initial values of u and w, $u_1$ and $w_1$ are adopted. The vector $v_{curve}$ obtained from the converged u and w is expressed by $v_{curve2}$.

The vector $v_{curve}$, which is finally obtained through the above-mentioned repeated computation, is expressed by $v_{curve\ final}$. In the middle of this repeated computation, if the values of u and w exceed the limit $0 \leq u$ and $w \leq 1$, the computation is switched on the curved surface patch involved in the direction exceeded and is repeated. These processes are involved in steps 4_10 and 4_11 in FIG. 4. In in step 4_12, the thus evaluated $v_{curve\ final}$ is determined as the closest vector $v_{closest}$. FIG. 6 shows the situation of the above-mentioned convergent process.

(Case 2: three-dimensional convex objects; one of two convex objects is the convex curved surface object, and another is the convex polyhedron)

Here, there will be described only the difference from case 1.

In the process for evaluating the closest vector between two objects of interest, in a case where one of two convex objects is the convex curved surface object, and another is the convex polyhedron, the closest vector $v_{closest}$ is finally computed, by means of repeatedly performing the processes of steps 4_1 to 4_8, for the convex polyhedron, and by means of repeatedly performing the processes of steps 4_1 to 4_11, for the convex curved surface object.

(Case 3: two-dimensional convex objects; both two convex objects are the convex curved surface objects)

The above-mentioned closest vector computing scheme is applicable also to the two-dimensional convex objects. Hereinafter, the curved patch is considered with the spline curve (B-spline curve). The processes of steps 4_1 to 4_8 in FIG. 4 are also applicable even in case of two-dimensional convex objects in their present form. In this case, the term "select curved surface patch" in step 4_9 in FIG. 4 is replaced by the term "select curved line patch". The updating process of the vector $v_{curve,\ i}$ in step 4_10 of FIG. 4 is as follows.

It is assumed that one of two B-spline curves selected on two objects of interest is expressed by $$P_i(t) = [t^3\ t^2\ t\ 1]M_R = \begin{bmatrix} Q_{i-1} \\ Q_i \\ Q_{i+1} \\ Q_{i+2} \end{bmatrix}$$

$$M_R = \begin{bmatrix} -1/6 & 1/2 & -1/2 & 1/6 \\ 1/2 & -1 & 1/2 & 0 \\ -1/2 & 0 & 1/2 & 0 \\ 1/6 & 2/3 & 1/6 & 0 \end{bmatrix}$$

where $Q_i$ denotes the control point of the B-spline curve. Now, a real root of the following equation J(t)=0, where the inner product of a differentiation of the B-spline curve by t and the vector $v_{curve,\ i}$ is set to 0, is evaluated on the condition to satisfy $0 \leq t \leq 1$. The similar procedure is applied also to another of the two B-spline curves selected, and the evaluated points are coupled with each other, so that the vector $v_{curve,\ i}$ is provided for the subsequent step. Hereafter the processing is similar to that of the three-dimensional objects.

$$J(t) \equiv \frac{dP_i(t)}{dt} \cdot v_{curve} = [3t^2\ 2t\ 1\ 0]M_R \begin{bmatrix} Q_{i-1} \cdot v_{curve} \\ Q_i \cdot v_{curve} \\ Q_{i+1} \cdot v_{curve} \\ Q_{i+2} \cdot v_{curve} \end{bmatrix} = 0$$

$$v_{curve} = \begin{bmatrix} v_x \\ v_y \end{bmatrix}$$

(Case 4: two-dimensional convex objects; one of two convex objects is the convex curved surface object, and another is the convex polyhedron)

In the process for evaluating the closest vector between two objects of interest, in a case where one of two convex objects is the convex curved surface object, and another is the convex polyhedron, the closest vector $v_{closest}$ is finally computed, by means of repeatedly performing the processes of steps 4_1 to 4_8, but rewritten for the two-dimensional objects in a similar fashion to that of the case 3, for the convex polyhedron, and by means of repeatedly performing the processes of steps 4_1 to 4_11, but rewritten for the two-dimensional objects in a similar fashion to that of the case 3, for the convex curved surface object.

Next, there will be explained a scheme of evaluating the closest vector in a case where two convex objects move or deform on a time basis. Here, it is assumed that the two convex objects of interest are three-dimensional objects, and both the two convex objects are the convex curved surface objects. With respect to other cases also, in a similar fashion to that of the above-mentioned matter, the more simplified algorithm is applicable.

Figure 7:
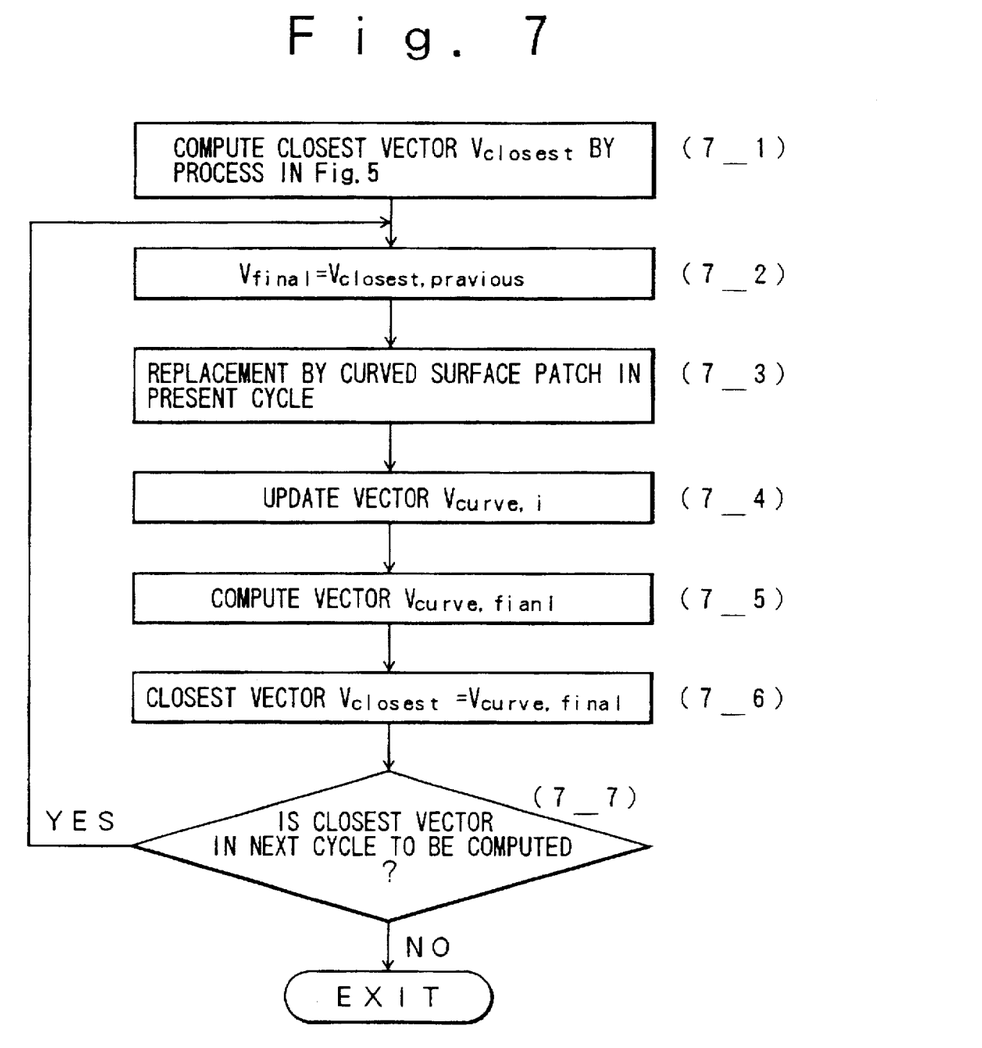
FIG. 7 is a flowchart useful for understanding the details of an algorithm for computing the closest vector in a case where the object of interest is moved or deformed.

In a case where the closest vector between two convex curved surface objects is continuously evaluated on a time basis, the process of FIG. 4 is replaced by that of FIG. 7.

First, in step 7_1, the first closest vector is evaluated in accordance with the process which is the same as that of FIG. 4. In step 7_2, the closest vector evaluated in step 7_1 is substituted for $v_{final}$ in the form of $v_{closest,\ previous}$. In step 7_3, the curved surface patch is changed from the curved surface patch of the frame immediately before to the curved surface patch of the current frame. In steps 7_4 to 7_6, the processes similar to that of steps 4_10 to 4_12 in FIG. 4 are performed. In step 7_7, it is determined as to whether a computation of the closest vector for the subsequent frame is carried out or not, and if it is determined that the computation is to be carried out, the program returns to step 7_2, so that the processing is repeatedly performed in the form of $V_{closest, previous}$ now evaluated.

On the other hand, in a case where the objects are the convex polyhedrons, the process in step 7_4 performs the inner product computation shown in FIG. 5 for the convex polyhedrons, and the updating computation shown in FIG. 6 for the convex curved surface objects.

Likely also in case of the two-dimensional objects, the system is enlarged to the continuous type.

As mentioned above, according to the present invention, on arbitrary convex objects in which both two convex objects of interest or one of the two convex objects are represented by the convex curved surface patch, the distance between the closest points of the two convex objects is evaluated with great accuracy and at high speed. It is possible to evaluate the distance between the closest points of the two convex objects or the collision state on a real time basis, for example, while the two convex objects are displayed on a display screen and are moved or deformed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An arithmetic unit in a computer for computing a closest distance between a first and a second three-dimensional convex object, at least one of the objects being a convex curved surface object, in accordance with shape information including arrangement position information about the objects, the arithmetic unit comprising:

first closest vector arithmetic means for identifying a preliminary closest vector coupling the closest points of the two objects, displayed on a computer screen by repeatedly calculating for each object an inner product of a candidate for the preliminary closest vector directed from a first of the two objects to a second of the two objects and a plurality of position vectors, each position vector being one of:

a position vector of a vertex where the first object is a convex polyhedron defined by vertexes, and a position vector of a control point of a convex curved surface patch where the first object is a convex curved surface object comprising sets of convex curved surface patches defined by control points, wherein a position vector for each object having a maximum inner product is extracted and a new candidate for the preliminary closest vector is formed by a vector connecting the two position vectors; and second closest vector arithmetic means for correcting the preliminary closest vector identified by said first closest vector arithmetic means to identify a new closest vector perpendicularly intersecting a tangent plane in contact with the object having a convex curved surface at the closest point of the object having a convex curved surface by starting from the preliminary closest vector and sequentially updating a given coordinate on the surface of the object having a convex curved surface until an inner product of a vector on the tangent plane and the closest vector on the given coordinates has the smallest possible value.

2. An arithmetic unit according to claim 1, wherein said arithmetic unit further comprises collision determination means for determining whether the first and second objects are in a collision state in accordance with the new closest vector evaluated by said second closest vector arithmetic means.

3. An arithmetic unit according to claim 1, wherein said arithmetic unit further comprises:

shape information storage means for storing shape information comprising sets of the control points constituting the convex curved surface patches constituting the object having a convex curved surface including sets of the vertexes of a convex polygon in a case where one of the objects is a convex polyhedron;

shape information updating means for performing arithmetic on coordinates after a movement or a deformation of the vertexes or the control points of the objects in accordance with information for instructing a movement or a deformation of the objects, thereby evaluating a new shape information; and curved surface patch information producing means for producing convex curved surface patches constituting the object having a convex curved surface in accordance with the shape information of the object having a convex curved surface.

4. An arithmetic unit according to claim 3, wherein when the object is moved or deformed, said second closest vector arithmetic means modifies the new closest vector evaluated before a current movement or deformation to a further new closest vector, instead of evaluating a closest vector after a movement or a deformation by said first closest vector arithmetic means.

5. An arithmetic unit according to claim 3, wherein said arithmetic unit further comprises display means for displaying the objects based on the shape information stored in said shape information storage means and the new shape information evaluated by said shape information updating means.

6. An arithmetic unit in a computer for computing a closest distance between a first and a second two dimensional convex object, at least one of the objects being a convex curved line object, in accordance with shape information including arrangement position information about the objects, comprising:

first closest vector arithmetic means for identifying a preliminary closest vector coupling the closest points of the two objects, displayed on a computer screen by repeatedly calculating for each object an inner product of a candidate for the preliminary closest vector directed from a first of the two objects to a second of the two objects and a plurality of position vectors, each position vector being one of:

a position vector of a vertex where the first object is a convex polyhedron defined by vertexes, and a position vector of a control point of a convex curved line patch where the first object is a convex curved line object comprising sets of convex curved surface patches defined by control points, wherein a position vector for each object having a maximum inner product is extracted and a new candidate for the preliminary closest vector is formed by a vector connecting the two position vectors; and second closest vector arithmetic means for correcting the preliminary closest vector identified by said first closest vector arithmetic means to identify a new closest vector perpendicularly intersecting a tangent plane in contact with the convex curved line object at the closest point of the convex curved line object by starting from the preliminary closest vector and sequentially updating a given coordinate on the surface of the object having a convex curved surface until an inner product of a vector on the tangent plane and the closest vector on the given coordinates has the smallest possible value.

7. An arithmetic unit according to claim 6, wherein said arithmetic unit further comprises collision determination means for determining whether the first and second objects are in a collision state in accordance with the new closest vector evaluated by said second closest arithmetic means.

8. An arithmetic unit according to claim 6, wherein said arithmetic unit further comprises:

shape information storage means for storing shape information comprising sets of the control points constituting the convex curved line patches constituting the convex curved line object, including sets of the vertexes of a convex polygon where one of the objects is a convex polyhedron;

shape information updating means for performing arithmetic on coordinates after a movement or a deformation of the vertexes or the control points of the objects in accordance with information for instructing a movement or a deformation of the objects, thereby evaluating a new shape information; and curved line patch information producing means for producing convex curved line patches constituting the convex curved line object in accordance with the shape information of the convex curved line object.

9. An arithmetic unit according to claim 8, wherein when the object is moved or deformed, said second closest vector arithmetic means modifies the new closest vector evaluated before a current movement or deformation to a further new closest vector, instead of evaluating a closest vector after a movement or a deformation by said first closest vector arithmetic means.

10. An arithmetic unit according to claim 8, wherein said arithmetic unit further comprises display means for displaying the objects based on the shape information stored in said shape information storage means and the new shape information evaluated by said shape information updating means.

* * * * *